United States Patent
Bhowmik et al.

(10) Patent No.: US 7,401,259 B2
(45) Date of Patent: Jul. 15, 2008

(54) SYSTEM AND METHOD FOR SCENARIO GENERATION IN A DISTRIBUTED SYSTEM

(75) Inventors: Sushrut Bhowmik, West Bengal (IN); Shubhankar Sumar, West Bengal (IN)

(73) Assignee: Sun Microsystems, Inc., Santa Clara, CA (US)

( * ) Notice: Subject to any disclaimer, the term of this patent is extended or adjusted under 35 U.S.C. 154(b) by 731 days.

(21) Appl. No.: 10/464,945

(22) Filed: Jun. 19, 2003

(65) Prior Publication Data

US 2004/0260982 A1    Dec. 23, 2004

(51) Int. Cl.
G06F 11/00 (2006.01)
G06F 11/22 (2006.01)

(52) U.S. Cl. .............................. 714/31; 714/32; 714/33

(58) Field of Classification Search ................... 714/31, 714/32, 33
See application file for complete search history.

(56) References Cited

U.S. PATENT DOCUMENTS

| | | | | |
|---|---|---|---|---|
| 4,456,994 A | * | 6/1984 | Segarra ........................ 714/33 |
| 5,021,997 A | * | 6/1991 | Archie et al. .................. 714/31 |
| 5,371,883 A | * | 12/1994 | Gross et al. ................... 714/38 |
| 5,421,004 A | * | 5/1995 | Carpenter et al. ............. 714/25 |
| 5,544,310 A | * | 8/1996 | Forman et al. ................ 714/31 |
| 5,664,093 A | * | 9/1997 | Barnett et al. ................. 714/31 |
| 5,881,237 A | | 3/1999 | Schwaller et al. |
| 5,909,544 A | * | 6/1999 | Anderson et al. ........... 709/208 |
| 6,002,868 A | * | 12/1999 | Jenkins et al. ............... 717/105 |
| 6,002,871 A | * | 12/1999 | Duggan et al. .............. 717/135 |
| 6,167,534 A | * | 12/2000 | Straathof et al. ............. 714/38 |
| 6,279,124 B1 | * | 8/2001 | Brouwer et al. .............. 714/38 |
| 6,434,513 B1 | | 8/2002 | Sherman et al. |
| 6,449,744 B1 | * | 9/2002 | Hansen ....................... 714/738 |
| 6,701,456 B1 | * | 3/2004 | Biessener ..................... 714/20 |
| 6,704,883 B1 | * | 3/2004 | Zhang et al. ................... 714/4 |
| 7,113,883 B1 | * | 9/2006 | House et al. ................ 702/122 |
| 7,137,039 B2 | * | 11/2006 | Durrant et al. ................ 714/47 |
| 7,324,912 B2 | * | 1/2008 | Gygi et al. .................. 702/120 |
| 2003/0074606 A1 | * | 4/2003 | Boker .......................... 714/42 |
| 2003/0120700 A1 | * | 6/2003 | Boudnik et al. ............. 709/102 |

(Continued)

OTHER PUBLICATIONS

The Multi-Boot Configuration Handbook Published by Que Mar. 29, 2000 ISBN 0-7897-2283-6.*

(Continued)

Primary Examiner—Scott T Baderman
Assistant Examiner—Joseph Schell
(74) Attorney, Agent, or Firm—Robert C. Kowert; Meyertons, Hood, Kivlin, Kowert & Goetzel, P.C.

(57) ABSTRACT

A system and method may emulate scenarios for testing a distributed system. The distributed system may include a plurality of nodes, each having one or more resources. The system may include a resource driver for each type of the one or more resources in the distributed system, as well as one or more agents configured to access each resource through the corresponding resource driver. At least one node in the distributed system may be configured to run on a different platform than another node in the distributed system. The system may further include a central controller configured to communicate with each agent. The central controller may further execute a test scenario script containing one or more test scenarios for the distributed system.

27 Claims, 6 Drawing Sheets

U.S. PATENT DOCUMENTS

2004/0199818 A1* 10/2004 Boilen et al. ............... 714/25
2004/0205406 A1* 10/2004 Kaliappan et al. .......... 714/31
2005/0102580 A1* 5/2005 House et al. ............... 714/38
2005/0268171 A1* 12/2005 House et al. ............... 714/32

OTHER PUBLICATIONS

Microsoft Computer Dictionary fifth edition Published by Microsoft Press, 2002.*
Bruce Sanderson's Windows Web Glossary http://members.shaw.ca/bsanders/Glossary.htm.*
Introduction to Databases by Erik Bansleben and Gary Orthuber, Jan. 29, 2002 http://www.techsoup.org/howto/articles/databases/page2662.cfm.*
Application Servers: An Introduction by Todd Sundsted http://www.javaworld.com/javaworld/jw-12-1998/jw-jbe-appservers_p.html Oct. 25, 2000 version found via The Way Back Machine.*
Novel Gateway Interconects Operating Systems http://www.electronicstalk.com/news/ose/ose107.html Edited Mar. 14, 2002.*
Special Edition Using MS-DOS 6.22, Third Edition by Jim Cooper Published by Que Jun. 12, 2001 ISBN-10: 0-7897-2573-8, Chapter 12 included.*
Wikipedia's Operating System version from May 29, 2003.*
Wikipedia's Test Engineer retrieved May 28, 2007, first 2 pages included.*
Wikipedia's Device Driver retrieved May 28, 2007.*
Scirpting: Higher Level Programming for the $21^{st}$ Centry by John Ousterhout IEEE Computer magazine Mar. 1998 retrieved from http://www.tcl.tk/doc/scripting.html on Nov. 28, 2007.*
How Computers Work Seventh Edition by Ron White Published by Que Publishing Oct. 2003 ISBN 0-7897-3033-2.*
Herrscher, D., et al. "A Dynamic Network Scenario Emulation Tool," In Proceedings of the $11^{th}$ International Conference on Computer Communications and Networks (ICCCN '02), 2002, 8 pages.
Bateman, et al., "A Scenario Driven Emulator for Wireless, Fixed and Ad Hoc Networks," 2003 PGNet, 6 pages.

* cited by examiner

SYSTEM AND METHOD FOR SCENARIO GENERATION IN A DISTRIBUTED SYSTEM

BACKGROUND OF THE INVENTION

1. Field of the Invention

This invention relates to the field of distributed computer systems and, more particularly, to testing heterogeneous distributed systems.

2. Description of the Related Art

As workloads on modern computer systems become larger and more varied, more and more computational resources are needed. For example, a request from a client to web site may involve one or more load balancers, web servers, databases, application servers, etc. Alternatively, some large-scale scientific computations may require multiple computational nodes operating in synchronization as a kind of parallel computing.

Any such collection of resources tied together by a data network may be referred to as a distributed system. A distributed system may be a set of identical or non-identical nodes connected together by a local area network. Alternatively, the nodes may be geographically scattered and connected by the Internet, or a heterogeneous mix of computers, each providing one or more different resources. Each node may have a distinct operating system and be running a different set of applications.

Because of the large number of possible system configurations described above, testing such a system for reliability may prove difficult. Multiple test scenarios are needed to examine the system's response to various crashes, outages, workloads, and other events. Certain common scenarios may be covered by manual testing, but such manual tests may not be nearly exhaustive, and require extensive manpower resources.

Alternatively, automated testing and scripting methods may be used to expand the footprint of coverage, but these methods also have limits. Scripting may have to be individually tailored for each node or resource, and may require extensive modification in the event of a configuration change. In addition, scripts may not be applicable across different operating systems. For example, a UNIX shell script may provide ample testing functionality for a given server cluster, but would need to undergo significant modification if new servers were added to the cluster. The UNIX shell script would also not be operable on a system running Microsoft Windows™.

Furthermore, scripting for each resource may not allow for extensive interaction between resources, and may lack a central point of control and analysis. For example, a UNIX shell script running on one node may not be able to control the operation of another node. Because a distributed system may be useful precisely because it allows the interaction of scattered heterogeneous resources to be directed from a central location, this may represent a limitation in any such testing strategy.

SUMMARY

A system and method may emulate scenarios for testing a distributed system. The distributed system may include a plurality of nodes, each having one or more resources. The system may include a resource driver for each type of the one or more resources in the distributed system, as well as one or more agents configured to access each resource through the corresponding resource driver. In some embodiments, one or more nodes in the distributed system may be configured to run on one or more different platforms than other nodes in the distributed system. The system may further include a central controller configured to communicate with each agent. The central controller may further execute a test scenario script containing one or more test scenarios for the distributed system.

Figure 1:
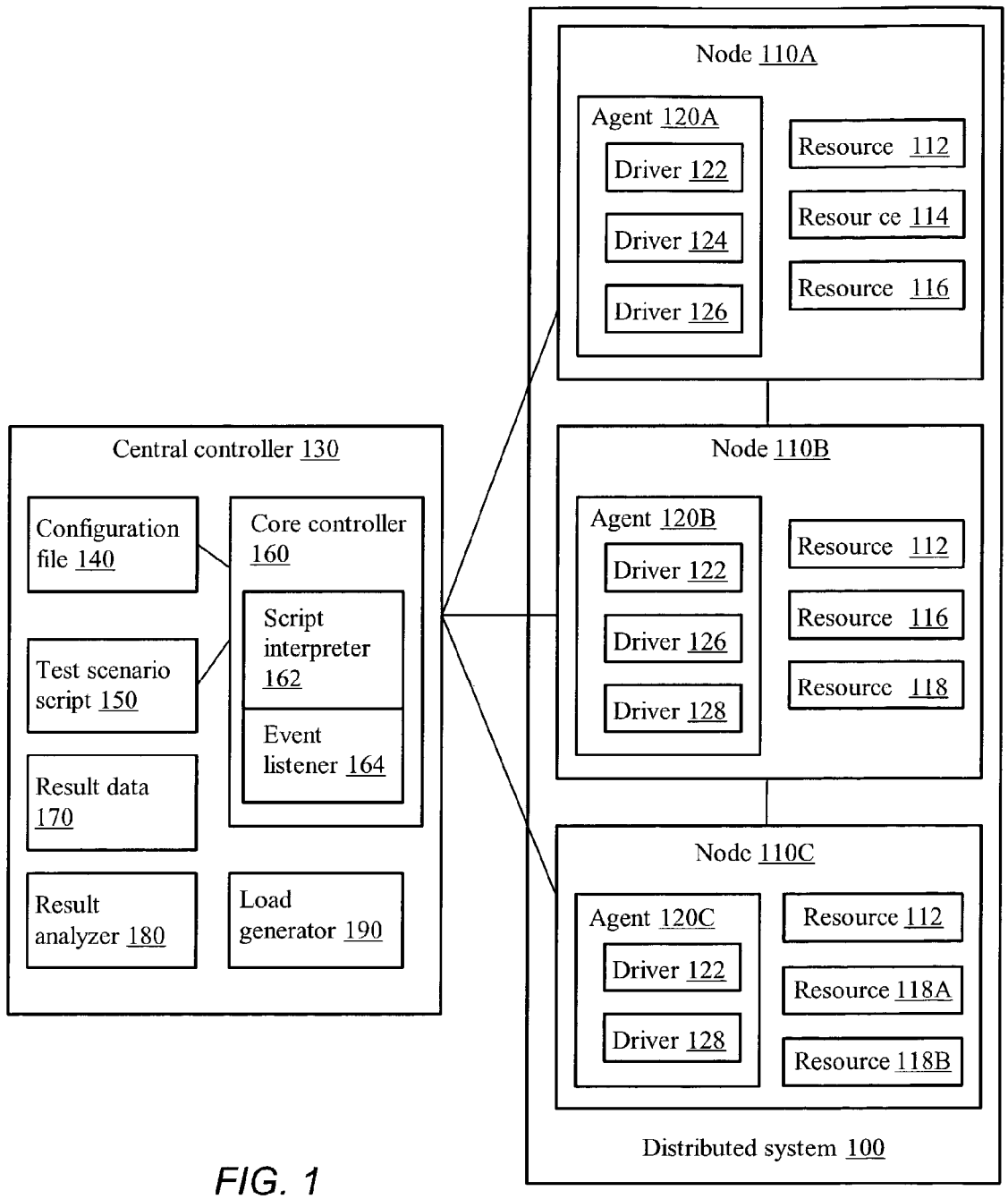
FIG. 1 is an exemplary distributed system along with a central controller and agents for scenario emulation, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Turning now to FIG. 1, an exemplary distributed system 100 is shown along with a central controller 130, according to one embodiment. Distributed system 100 includes nodes 110A-C, each of which further includes a corresponding agent 120A-C. Central controller 130 may include configuration file 140, test scenario script 150, and core controller 160, as well as result data 170, result analyzer 180, and load generator 190. Nodes 110A-C communicate to central controller 130 by some form of interconnect, which may be a system backplane, a local area network (LAN), a wide area network (WAN), the Internet, or some combination thereof.

Each node 110A-C may represent a computer system operable to perform one or more of a variety of functions within the distributed system 100. Such functions may include, but are not limited to, acting as a database, web server, directory server, application server, or e-commerce server. In addition, each node 110A-C in FIG. 1 may represent a cluster of multiple nodes acting in parallel but addressable as a single computer system. Alternatively, multiple nodes may be located on a single computer system, in the form of multiple virtual machines executing on a multi-processor system, for example. In one embodiment, one or more node 110A-C may be configured to run on a different platform than other nodes 110A-C in distributed system 100. In other embodiments, nodes 110A-C may all run on the same type of computing platform.

Each agent 120A-C is operable to receive unit operations from central controller 130 and implement the commands, as will be described below. Each agent 120A-C communicates with various resources 112, 114, 116 and 118A-B, which may correspond to various software applications, services or hardware devices located on each individual node 110A-C. Resources 112, 114, 116 and 118A-B may be operable to provide the functionality described above in regard to distributed system 100. For example, resource 112 may correspond to an SQL server, while resource 118A-B may correspond to an SQL client.

Each agent 120A-C contains drivers 122, 124, 126 and 128 which correspond to and are operable to access resources 112, 114, 116, and 118A-B, as will be described in further detail below. It is noted that in one embodiment, each driver 122, 124, 126 and 128 may correspond to a type of resource, rather than a single resource. In one embodiment, resources 118A-B may represent two instances of a single resource type, such as a SunONE (formerly iPlanet) application server, for example. As a result, both resources 118A-B may be accessible by driver 128.

Central controller 130 is operable to communicate with nodes 110A-C and control agents 120A-C in accordance with test scenario script 150, as will be described below. Core controller 160 may also be operable to read configuration file 140, which includes a list of which nodes are connected to central controller 130, as well as which resources are available on each node. Core controller 160 may also read test scenario script 150, which may contain one or more test scenarios to be performed by distributed system 100.

Each test scenario represents a sequence of script commands designed to access one or more resources 112, 114, 116 and 118, and thereby test the functionality of one or more nodes 110A-C. An end user may be able to select one or more of the test scenarios in test scenario script 150 via a user interface. Each selected test scenario may then be executed on central controller 130, thereby allowing the end user to test any functionality which may be tested by a test scenario.

Each test scenario in test scenario script 150 may be written as a Java program, Bean shell or any other scripting language, depending on implementation. For example, the following is an exemplary script implemented using the Bean shell:

<resource-id>.<fn-name-declared-in-the-corresponding-resource-driver>(<parameters> . . . . )
<local-object>.<method>(<parameters> . . . )
<bean-shell-commands>(<parameters . . . )

Thus, for example, a first instance of a resource type called "iWS" that implements a method called "restart( )" may be invoked in the script by calling:

iws1.restart( )

Test scenario commands are ultimately used to interact with resources 112, 114, 116 and 118A-B as will be described below. Any results that are output from resources 112, 114, 116 and 118A-B in response to the test scenario commands may then be stored as result data 170. Result analyzer 180 is operable to analyze result data 170 by subjecting result data 170 to set of pass/fail criteria, as will be described below.

Core controller 160 further comprises script interpreter 162 and event listener 164. Script interpreter 162 is operable to translate the test scenario commands from a given scripting language into actions for central controller 130 to execute, and unit operations, which may be communicated to distributed system 100 by core controller 160. These unit operations may then be carried out by resources 112, 114, 116, and 118A-B as described below.

It is noted that many of the details in FIG. 1 are purely illustrative, and that other embodiments are possible. For example, the number of nodes, resources, drivers and interconnections between nodes may differ from what is shown in FIG. 1. Furthermore, central controller 130 is shown as a separate entity from distributed system 100, and in some embodiments may be a standalone computer system of many different types. However, some or all of the illustrated components of central controller 130 may also be software processes executed on a node within distributed system 100. Furthermore, many of the components of central controller may be stored at other locations, such as in a networked shared storage location, for example.

It is also noted that various communications protocols may be employed between central controller 130 and agents 120A-C, including RMI/IIOP, JMS, or other protocols, for example.

Figure 2:
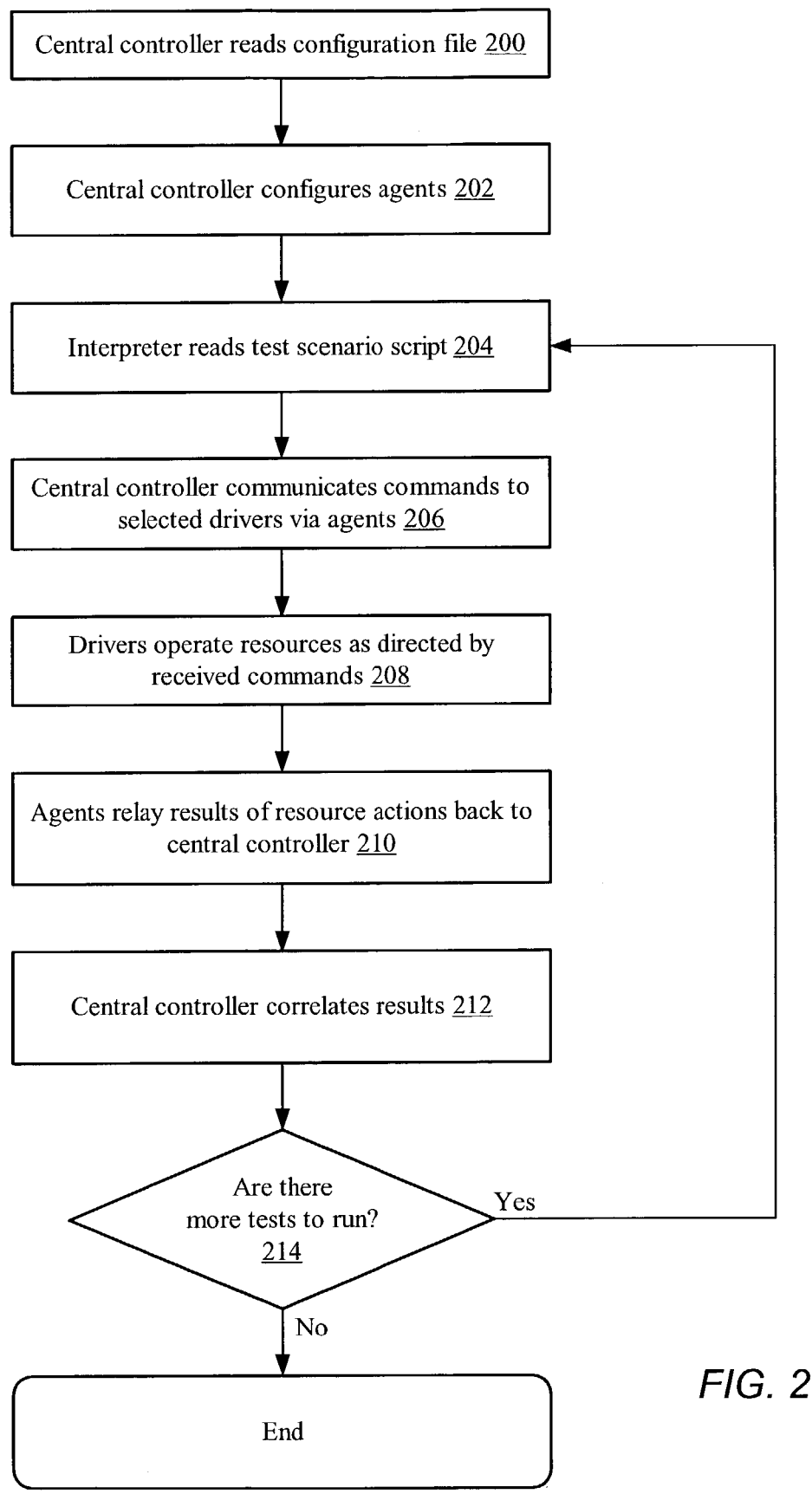
FIG. 2 is a flowchart illustrating the operation of the central controller and agents, according to one embodiment.

Turning now to FIG. 2, a flowchart illustrating the operation of central controller 130 and distributed system 100 is shown. Referring collectively now to FIGS. 1-2, core controller 160 is operable to read configuration file 140, as indicated at 200. Configuration file 160 may contain information on resources 112, 114, 116 and 118A-B in distributed system 100. Configuration file 160 may also include information on agents 120A-C which are connected to central controller 130, such as agent identification numbers or agent network addresses, port numbers, for example. Configuration file 160 may further include information on the location of resources 112, 114, 116 and 118A-B on nodes 110A-C in distributed system 100.

In 202, core controller 160 initiates communication with agents 120A-C. Core controller 160 may also communicate to each agent 120A-C information on which resources 112, 114, 116 and 118A-B, are under that particular agent's control.

In 204, script interpreter 162 parses a test scenario from test scenario script 150. These test scenarios may be written in a scripting language such as Bean shell, for example, and may be parsed into one or more unit operations targeted towards only one specific resource type. In 206 core controller 160 sends out the unit operations from 204 to agents 120A-C. In response, agents 120A-C may relay the commands to drivers 122, 124, 126, and 128.

In 208 drivers 122, 124, 126, and 128 operate the respective resources 112, 114, 116, and 118A-B as indicated by the received unit operations. In response to executing the unit operations, resources 112, 113, 116 and 118A-B may output various results, which may then be relayed to agents 120A-C. As disclosed above, resources 112, 114, 116 and 118A-B may be operable to provide various functionalities of distributed system 100. Thus, testing resources 112, 114, 116, and 118A-B may successfully test the functionality of distributed system 100.

In 210 agents 120A-C relay one or more results of carrying out the platform independent commands on resources 112, 114, 116 and 118A-B. These results are then stored as result data 170 on central controller 130.

In 212 central controller 130 may use result analyzer 180 to examine result data 170. By comparing result data 180 to a set of pass/fail criteria, result analyzer 180 may determine if distributed system 100 has passed or failed the test scenario outlined in test scenario script 150.

In one embodiment, result analyzer 180 may be a set of libraries. The set of libraries may include functions for comparing strings and files, for example. In one embodiment, the result analyzer library set may include one or more functions for searching for an occurrence of a key word from a file or log. In one embodiment, the user may define logic in the script for deciding PASS or FAIL. The inputs may be return value of the remote commands, result of string/file comparison, number of occurrences of a keyword in a file/log/http response, etc. The following is a bean shell (java syntax) script as an example:

```
/* set a pointer at the end of the log */
s1as1.initializeLog( );
/* Stops the application server identified by s1as1 */
String a1 = s1as1.stop( );
/* sends an HTTP request of id 1 at http://host:port/helloworld
with POST method and name value pair country=Nepal&lang=Nepali */
HttpRequestGenerator.sendHttpRequest(1, s1as1.getProp("host"),
s1as1.getProp("port"), "/helloworld", "POST",
"country=Nepal&lang=Nepali");
/* Check for word 'ERROR'(case insensitively) in the response of
request id 1 */
int a2 - HttpRequestGenerator.presentInResponse(1, "ERROR",
"NONCASE");
/* Checking Number of times the word 'Shutting down' is present in
the log of application server identified by s1as1 */
int a3 = s1as1.isPresentInLog("Shutting down");
/* Now deciding the PASS/ FAIL of the test case */
if ((a1.startsWith("OK"))&&(a2>=1)&&(a3>=1))
    testcasePass( );
else
    testcaseFail( );
```

In step 214 central controller 130 determines if there are test scenarios remaining in test scenario script 150. If additional test scenarios remain, central controller 130 returns to step 204 and reads the next set of platform independent commands from test scenario script 150. If there are no remaining test scenarios, the method may end.

Figure 3:
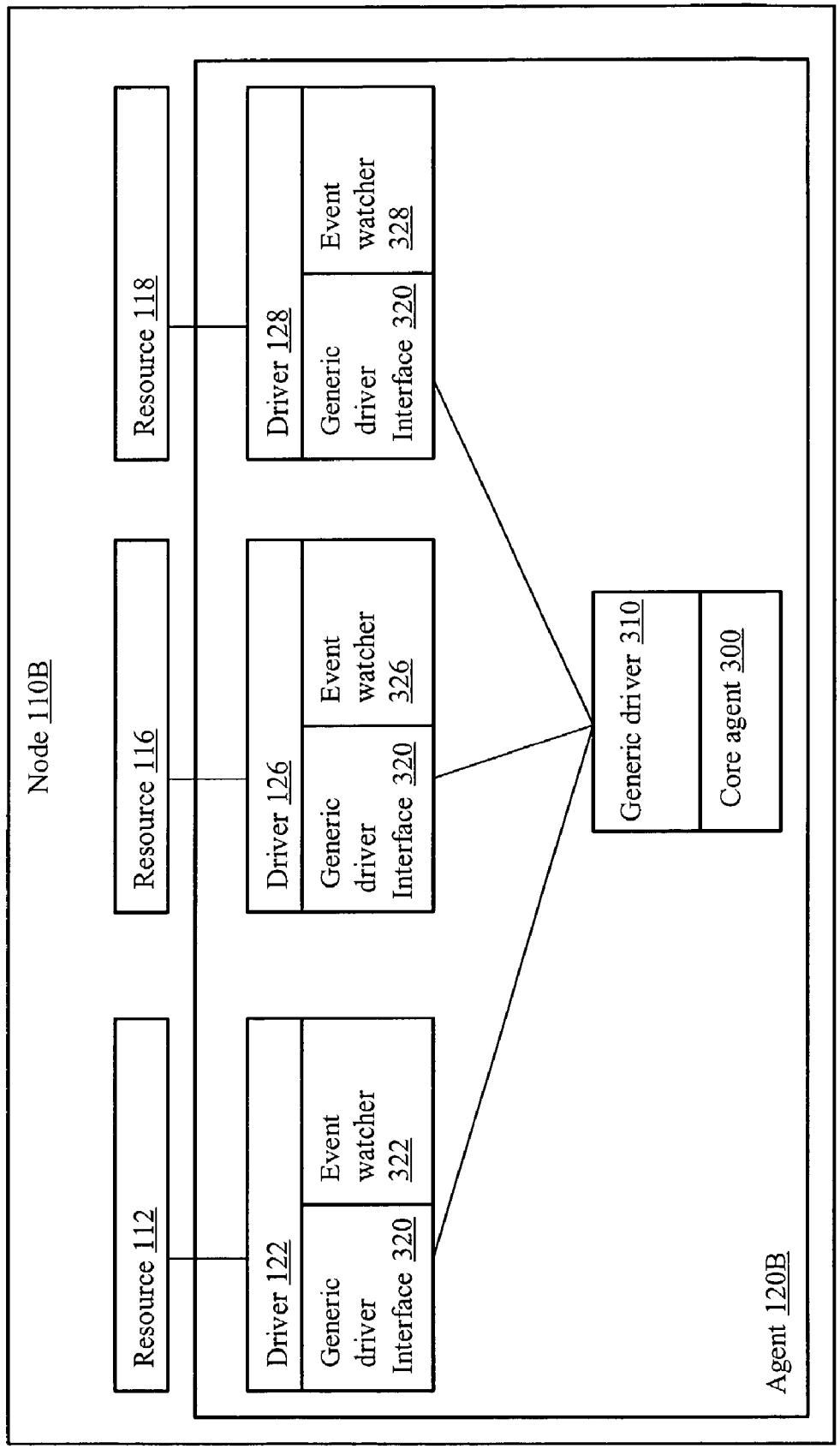
FIG. 3 is a detailed illustration of one embodiment of a node in the distributed system.

FIG. 3 shows a more detailed illustration of node 10B, according to one embodiment. In addition to agent 120B, resources 112, 116, and 118A-B, and drivers 122, 126 and 128, node 110B further includes a core agent 300, a generic driver 310, multiple copies of generic driver interface 320 and resource-specific event-watchers 322, 326 and 328 coupled to drivers 122, 126 and 128. Similar structures are also found in nodes 110A and 110C, as well as any other nodes that may be found in alternate embodiments.

In accordance with FIGS. 1-3 above, central controller 130 communicates unit operations to an agent 120, which operates resources 112, 114, 116 and 118A-B as indicated by the unit operations. This process begins with the communication of a unit operation from the core controller 160 to core agent 300. Core agent 300 is operable to relay the platform independent commands to generic driver interface 320 through generic driver 310.

Generic driver interface 320 implements an application programming interface (API) such that the generic driver may communicate with drivers 122, 124, 126 and 128, and thereby pass unit operations through drivers 122, 124, 126 and 128 to resources 112, 114, 116 and 118A-B. Thus, central controller 130 is operable to interact with resources 112, 114, 116 and 118A-B, each of which may be specific to a certain platform or operating system.

It is noted that, depending on the scripting language used and the particular structure of the script commands, it may thus be possible for a user to construct a script that is applicable to a variety of similar resources on multiple platforms. For example, a test scenario may test a resource's implementation of various structured query language (SQL) commands. This same test scenario may thus be applicable, with minimal modification, to any resource that uses SQL commands with minimal modification, as long as all tested resources are operable to interact with a corresponding driver that implements generic driver interface 320.

It is further noted that new types of resources may be added to any node 120A-C in the system, thus providing scalability. As long as the corresponding driver for the new resource implements the generic driver interface, the associated agent 120A-C may be operable to communicate with the new driver, as will be described below.

Figure 4:
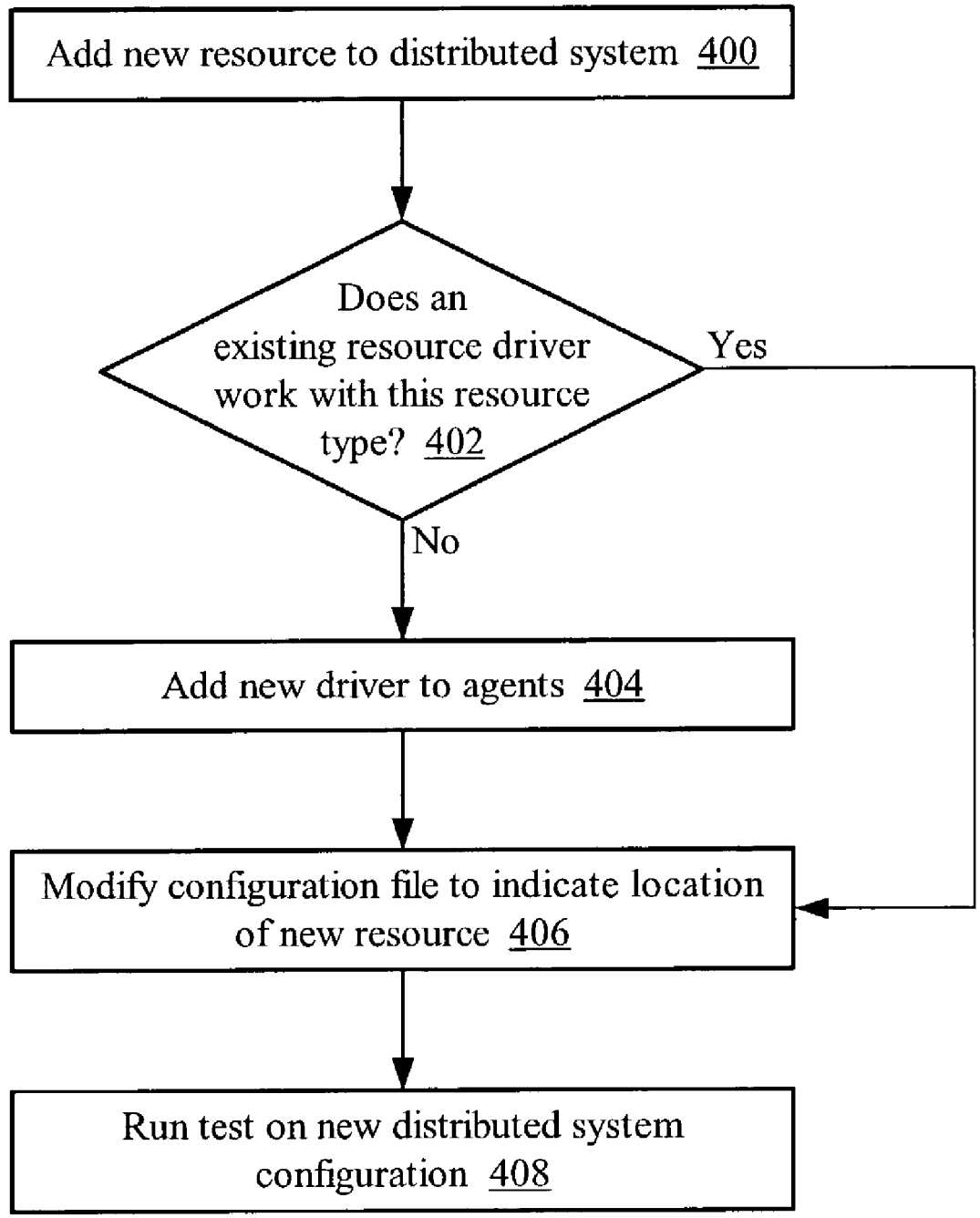
FIG. 4 is a flowchart illustrating the addition of a new resource to the distributed system, according to one embodiment.

Turning now to FIG. 4, a flowchart illustrating the addition of a new resource to distributed system 100 is shown. In 400, an additional resource is added to one or more nodes 110A-C in distributed system 100. In 402, the user must determine if the new resource is of a new type, and thus incompatible with the existing drivers 122, 124, 126 and 128.

If the resource is of a new type, the user may add a new driver to any agents 120A-C which exist on nodes 110A-C which include the new resource in 404. The new driver may be configured to operate any features of the new resource that the user wishes to test. The new driver may also implement generic driver interface 320, which allows communication between the driver and the corresponding agent 120A-C, as described below.

After a new driver has been added to agents 120A-C, or if a new driver is not needed for the new resource to interact with agent 120A-C, the user advances to 406. In 406, the user modifies configuration file 140 to indicate for central controller 130 which nodes 110A-C contain the new resource.

In 408, the user executes one or more test scenarios from test scenario script 150 on distributed system 100, which includes the new resource. Because central controller 130 and distributed system 100 have been configured to interact with the new driver, any test scenario in test scenario script 150 that is operable to interact with the new resource may not have to be modified, since all configuration for the new resource is already complete. Also, the resource driver implementation may be modified at anytime without modification of the test scenario script.

Each driver 122, 124, 126 and 128 may also have a corresponding event watcher 322, 324, 326 and 328, as shown in FIG. 3, which monitors resource-specific events that may occur during execution of the test scenario. One instance on an event might be a specific server in a server cluster becoming the primary server in the cluster, for example.

In response to a resource-specific event, each event watcher 322, 324, 326 and 328 may be operable to notify event listener 164, which may be configured to maintain an event log of all such event notifications. In certain embodiments, this event log may be included in result data 170, and may be used as part of the criteria used by result analyzer 180 to determine if a test scenario has passed or failed.

Furthermore, test scenario script 150 may specify a set of events which may trigger additional platform independent commands to be sent to agents 120A-C. More specifically, test scenario script 150 may contain a command for registering one or more specific events, and one or more additional commands that will be issued if and when the one or more specific events occur. For example, the following is an exemplary command structure for the registerEBC script command, which controls registration of one or more event-based commands as described above:

registerEBC(.*<event1>.*[<event2>|<event3>]*.*<event4>, <command or series of commands>)

Thus, upon detection of a series of events registered with central controller 130 by the registerEBC script command, central controller 130 may execute the command or series of commands indicated by the registerEBC command.

Likewise, test scenario script 150 may contain a set of times or time periods which may trigger additional commands to be issued out when said times or time periods elapse. It is noted that, in various implementations, time-based commands may incorporate both a single time period (e.g. 10 minute from a given timer initialization) and a periodic timer (e.g. every 10 minutes from a given timer initialization). For example, the following is an exemplary command structure for the registerTBC script command, which controls registration of one or more time-based commands as described above:

registerTBC([1|0],<time-variable>=value, <command or series of commands>)

Another command used in time-based commands is the initTV script command, which may be used to initialize a given time period or periodic timer. For example, the following is an exemplary command structure for the initTV script command:

InitTV(<time-variable>[,<value>])

Test scenario script 150 may also act through the central controller 130 to control load generator 190, which is operable to generate a workload on distributed system 100. It is noted that load generator 190 may be a built-in component to central controller 130, a separate plug-in component, or a completely separate application. Event-based, time-based, and simulated workloads may thus allow for a more varied range of test scenarios with minimal human intervention.

Figure 5:
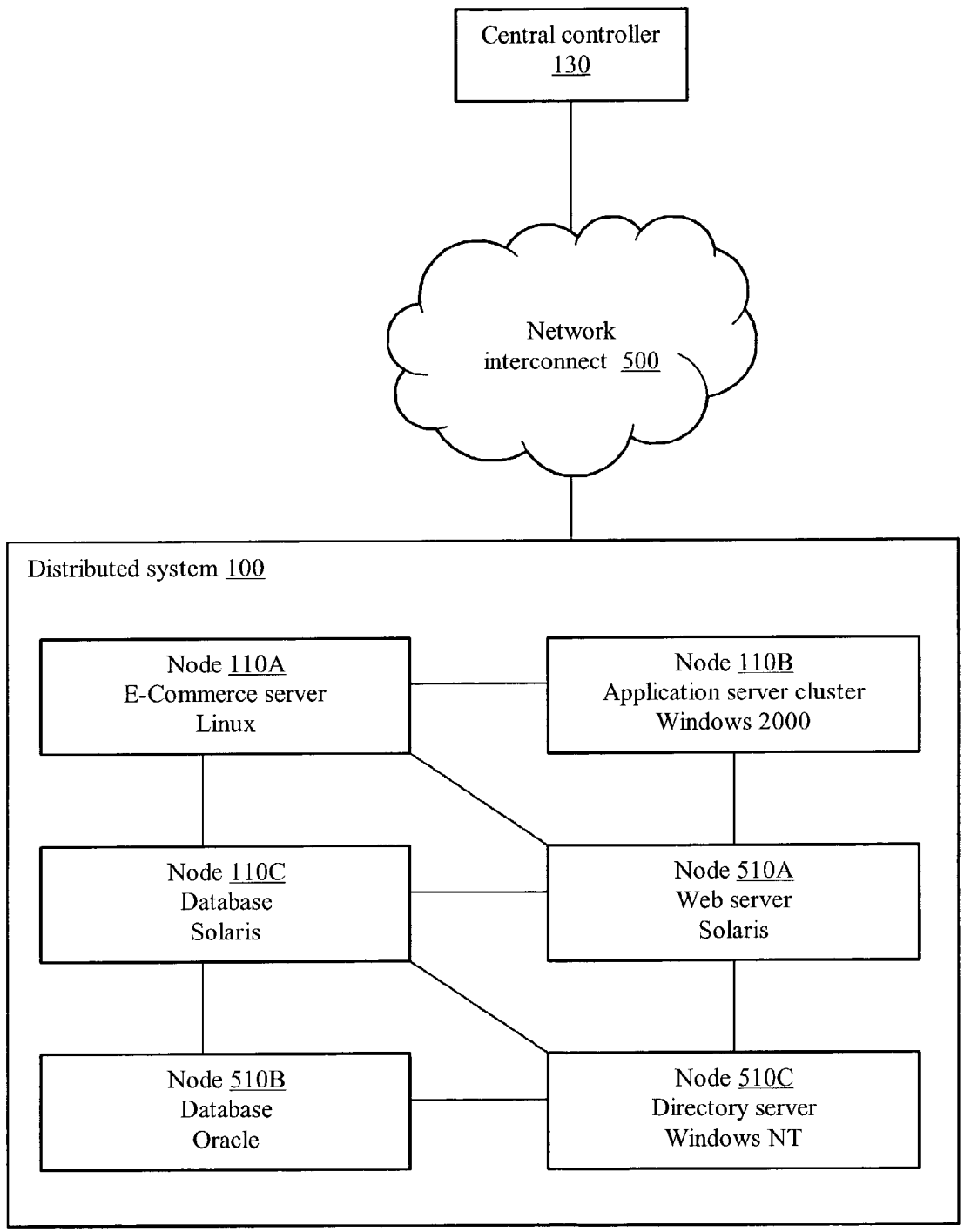
FIG. 5 is another embodiment of the distributed system and central controller.

FIG. 5 illustrates another embodiment of distributed system 100 and central controller 130. Here central controller 130 connects to the distributed system via network interconnect 500, which may be a LAN, WAN, or the Internet. Nodes 120A-C have been joined by additional nodes 510A-C. As can be seen from the diagram, the distributed system comprises various servers and multiple databases, operating on a wide variety of platforms and operating systems, such as Solaris, Linux, Windows and Oracle, for example. It is noted that the distributed system depicted in FIG. 5 is purely exemplary, and that alternate embodiments may include fewer or greater nodes, of different types and functionalities, than is depicted herein.

Figure 6A:
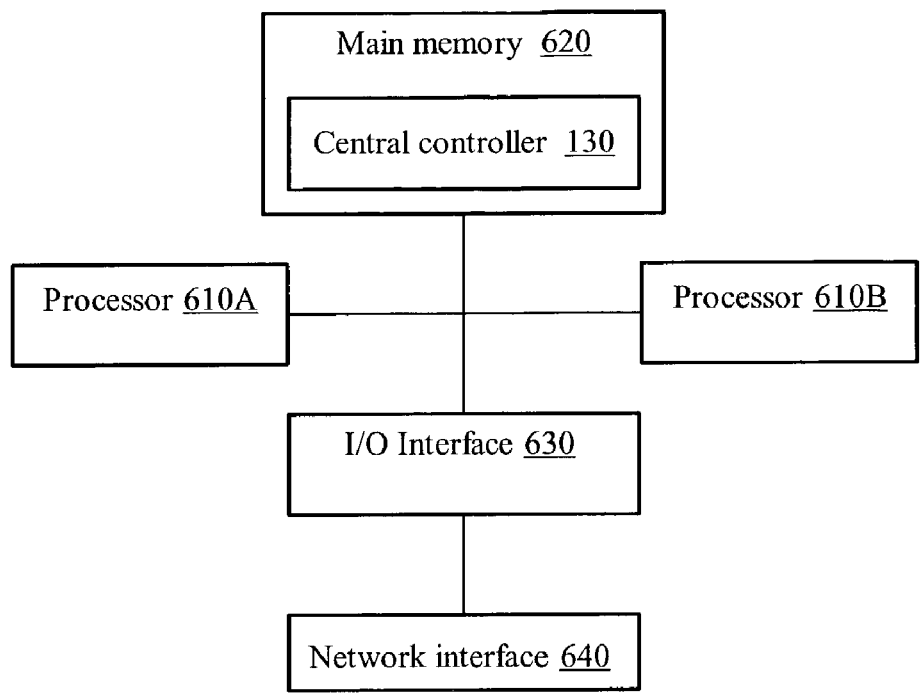
FIGS. 6A and 6B are various embodiments of an exemplary computer system for implementing certain embodiments.

Turning now to FIG. 6A, an exemplary computer subsystem 600 is shown. Computer subsystem 600 includes main memory 620, which is coupled to multiple processors 610A-B, and I/O interface 630. It is noted that the number of processors is purely illustrative, and that one or more processors may be resident on the node. I/O interface 630 further connects to network interface 640. Such a system is exemplary of a load balancing node, a server node or any other kind of computing node in a distributed system.

Processors 610A-B may be representative of any of various types of processors such as an x86 processor, a PowerPC processor or a CPU from the SPARC family of RISC processors. Likewise, main memory 620 may be representative of any of various types of memory, including DRAM, SRAM, EDO RAM, Rambus RAM, etc., or a non-volatile memory such as a magnetic media, e.g., a hard drive, or optical storage. It is noted that in other embodiments, main memory 600 may include other types of suitable memory as well, or combinations of the memories mentioned above.

As described in detail above in conjunction with FIGS. 1-5, processors 610A-B of computer subsystem 600 may execute software configured to test various resources on a distributed system. The test software may be stored in memory 520 of computer subsystem 600 in the form of instructions and/or data that implement the operations described above.

Figure 6B:
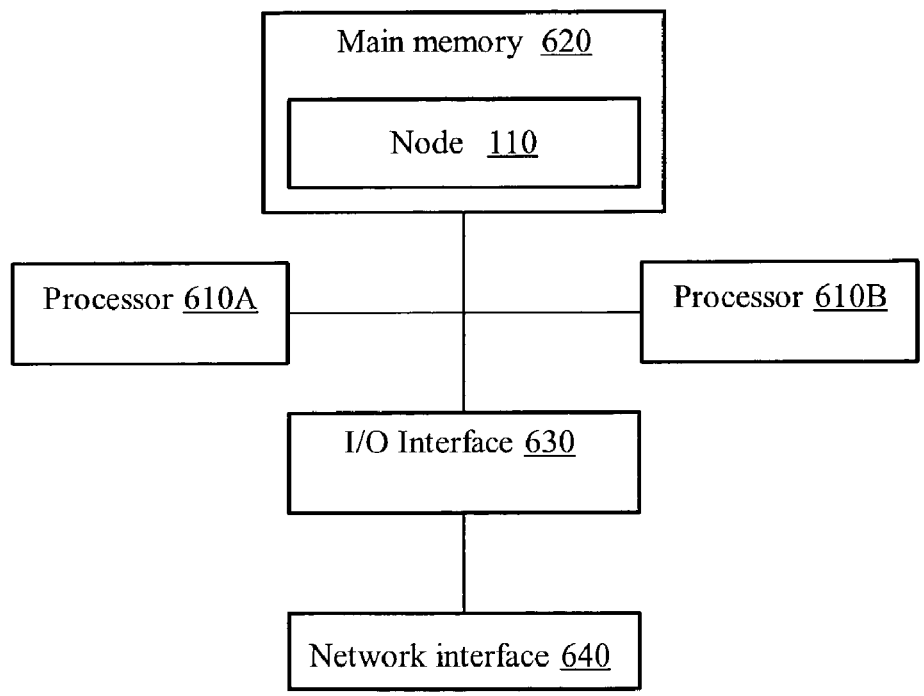

For example, FIG. 6A illustrates an exemplary central controller 130 stored in main memory 620. The instructions and/or data that comprise central controller 130 and any components contained therein may be executed on one or more of processors 610A-B, thereby implementing the various functionalities of central controller 130 described above. Likewise, FIG. 6B illustrates an exemplary node 110 stored in main memory 620 which may also be executed by processors 610A-B in a similar fashion.

In addition, other components not pictured such as a display, keyboard, mouse, or trackball, for example may be added to node 110. These additions would make node 110 exemplary of a wide variety of computer systems, such as a laptop, desktop, or workstation, any of which could be used in place of node 110.

Various embodiments may further include receiving, sending or storing instructions and/or data that implement the operations described above in conjunction with FIGS. 1-5 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
 a distributed system comprising a plurality of nodes, wherein each one of the plurality of nodes comprises:
  one or more computational resources of the distributed system;
  a resource driver for each type of the one or more computational resources; and
  an agent configured to access each of the one or more computational resources through the corresponding resource driver;
 a central controller configured to communicate with the agent on each of the plurality of nodes, wherein the central controller is configured to execute a test scenario script comprising one or more test scenarios for the distributed system, and wherein the central controller is configured to send commands to the agent on at least one of the plurality of nodes to implement the one or more test scenarios;
 wherein the central controller is further configured to read a configuration file prior to executing the test scenario script, wherein the configuration file comprises:
  information on the computational resources of the distributed system;
  agent identification numbers or agent network addresses or port numbers; and
  information on which agents correspond to which computational resources; and
 wherein each agent is configured to receive commands from the central controller and perform corresponding actions on the one or more computational resources residing on the agent's node, and wherein each agent is configured to return results from performing the corresponding actions to the central controller.

2. The system of claim 1 wherein at least one node is configured to run on a different platform than another node in the plurality of nodes; wherein the at least one node configured to run on a different platform than another node in the plurality of nodes runs on a different operating system than the another node in the plurality of nodes.

3. The system of claim 1 wherein the central controller comprises:
a core controller configured to communicate with the agent on each of the plurality of nodes to execute the test scenario script, and
a script interpreter operable to read the test scenario script and translate the test scenario script into central controller actions and unit operations for the core controller to send to the agents.

4. The system of claim 1 wherein the central controller further comprises a result analyzer operable to analyze the results returned from each of the agents to determine if the distributed system has passed or failed a test scenario in the test scenario script, wherein the results are stored in a central location.

5. The system of claim 1, comprising a load generator accessible by the central controller and configured to direct a plurality of requests at the distributed system, as indicated by the test scenario script.

6. The system of claim 1 wherein the central controller comprises a user interface configured to allow a user to specify one or more of the one or more test scenarios of the test scenario script to be executed by the central controller.

7. The system of claim 1 wherein one of the computational resources of the distributed system is a database.

8. The system of claim 1 wherein one of the computational resources of the distributed system is an application server.

9. The system of claim 1, wherein the central controller is configured to communicate information about the location and type of the computational resources of the distributed system to the agents upon reading the configuration file.

10. The system of claim 1, wherein each of the plurality of nodes in the distributed system is configured to accept additional resource types, and wherein each corresponding agent is configured to interact with additional resource drivers corresponding to the additional resource types.

11. The system of claim 1, wherein each resource driver comprises:
a generic resource driver interface to the agent; and
a resource-specific driver configured to access one or more functions of a specific resource type by translating one or more commands received from the central controller into resource-specific communications to carry out the commands.

12. The system of claim 1, wherein each resource driver comprises an event watcher configured to detect resource-specific events.

13. The system of claim 1, wherein each resource driver comprises a logging system configured to log resource-specific events or communications sent to and received from the central controller.

14. The system of claim 1, wherein the core controller comprises an event listener, wherein the event listener waits for notification from an agent that a specific resource event has occurred, and wherein in response to notification from an agent that the specific resource event has occurred, the core controller is configured to execute one or more central controller actions, or send one or more unit operations to the agent on at least one of the plurality of nodes, as specified by the test scenario script.

15. The system of claim 1, wherein the test scenario script registers certain times or time periods with the central controller, and wherein in response to a certain time or time period elapsing, the central controller is configured to execute one or more central controller actions, or send one or more unit operations to the agents, as specified by the test scenario script.

16. The system of claim 1, wherein the test scenario script is written in a scripting language and wherein each of the one or more test scenarios is represented by a sequence of script commands specified in the scripting language.

17. A method, comprising:
reading, by a central controller, a configuration file, wherein the configuration file comprises:
information on computational resources of a distributed system;
agent identification numbers or agent network addresses or port numbers; and
information on which agents correspond to which computational resources;
subsequent to reading the configuration file, executing, by the central controller, a test scenario script, wherein the test scenario script comprises one or more test scenarios to test the distributed system;
communicating commands according to the test scenario script between the central controller and a plurality of agents on each of a plurality of nodes within the distributed system;
wherein each one of the plurality of nodes comprises one or more of the computational resources of the distributed system and a resource driver for each type of the one or more computational resources; and
in response to each agent within the distributed system receiving commands from the central controller, each agent:
accessing each of the one or more computational resources through the corresponding resource driver;
performing corresponding actions on the one or more computational resources residing on the agent's node; and
returning results from performing the corresponding actions to the central controller.

18. The method of claim 17 wherein at least one node may be configured to run on a different platform than another node in the plurality of nodes, wherein the at least one of the plurality of nodes running on a different platform than another node in the plurality of nodes runs on a different operating system than another node in the plurality of nodes.

19. The method of claim 17, wherein said executing comprises:
translating the test scenario script into central controller actions and unit operations for the core controller to send to the agents.

20. The method of claim 17, further comprising the central controller analyzing the results returned from each of the agents to determine if the distributed system has passed or failed a test scenario in the test scenario script, wherein the results are stored in a central location.

21. The method of claim 17, wherein said executing a test scenario script comprises accessing a load generator to direct a plurality of transaction requests at the distributed system.

22. The method of claim 17, further comprising specifying one or more of the test scenarios of the test scenario script to be executed by the central controller through a user interface included in the central controller.

23. The method of claim 17, wherein upon reading the configuration file the central controller communicates information about the location and type of the computational resources of the distributed system to the agents.

24. The method of claim 17, further comprising:
adding a new resource to an agent in the distributed system;
adding a resource driver corresponding to a type for the new resource to the agent in the distributed system;
modifying the configuration file to indicate where the new resource is located in the distributed system.

25. The method of claim 17, further comprising:
detecting notification from an agent that a specific resource event has occurred with an event listener included in the core controller; and
executing one or more central controller actions, or sending one or more unit operations to the agents, in response to detecting notification from an agent that the specific resource event has occurred, as specified by the test scenario script.

26. The method of claim 17, further comprising:
registering certain times or time periods with the central controller; and
executing one or more central controller actions, or sending one or more unit operations to the agents, in response to detecting that certain times or time periods have elapsed, as specified by the test scenario script.

27. The method of claim 17, wherein the test scenario script is written in a scripting language and wherein each of the one or more test scenarios is represented by a sequence of script commands specified in the scripting language.

* * * * *